United States Patent
Li et al.

(10) Patent No.: US 11,465,212 B2
(45) Date of Patent: Oct. 11, 2022

(54) ELECTRIC MOTOR, LAMINATED IRON CORE AND MANUFACTURING METHOD THEREFOR

(71) Applicant: Siemens Ltd., China, Beijing (CN)

(72) Inventors: Chang Peng Li, Beijing (CN); Xu Hua, Shanghai (CN); Kateryna Svynarenko, Shanghai (CN); Guo Feng Chen, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 17/613,250

(22) PCT Filed: May 24, 2019

(86) PCT No.: PCT/CN2019/088381
§ 371 (c)(1),
(2) Date: Nov. 22, 2021

(87) PCT Pub. No.: WO2020/237434
PCT Pub. Date: Dec. 3, 2020

(65) Prior Publication Data
US 2022/0250151 A1    Aug. 11, 2022

(51) Int. Cl.
*B33Y 30/00* (2015.01)
*B33Y 10/00* (2015.01)
(Continued)

(52) U.S. Cl.
CPC ............ *B22F 10/28* (2021.01); *B22F 10/366* (2021.01); *B22F 10/50* (2021.01); *B23K 26/342* (2015.10);
(Continued)

(58) Field of Classification Search
CPC ......... B33Y 10/00; B33Y 30/00; B33Y 40/00; B33Y 50/00; B23K 26/34–342
See application file for complete search history.

(56) References Cited

U.S. PATENT DOCUMENTS

| 2017/0165791 A1* | 6/2017 | Kamachi | B23K 26/126 |
| 2019/0009464 A1* | 1/2019 | Steege | B33Y 30/00 |
| 2019/0061000 A1* | 2/2019 | Kar | B22F 1/054 |

FOREIGN PATENT DOCUMENTS

| CN | 106825551 A | 6/2017 |
| DE | 102016119654 A1 | 4/2018 |
| WO | WO 2018087067 A1 | 5/2018 |

OTHER PUBLICATIONS

English translation of International Search Report and Written Opinion dated Feb. 26, 2020.

* cited by examiner

*Primary Examiner* — Michael A Laflame, Jr.
(74) *Attorney, Agent, or Firm* — Harness, Dickey & Pierce, P.L.C.

(57) ABSTRACT

Provided are an electric motor, a laminated iron core, and a manufacturing method. In an embodiment, the method includes S1: introducing inert gas into an additive manufacturing printing apparatus, pouring silicon steel metal particles into a fanning cylinder of the apparatus, and performing laser scanning on the silicon steel metal particles to gradually melt the silicon steel metal particles into at least one silicon steel metal layer; and S2: continuing to pour silicon steel metal particles into the forming cylinder, and stopping performing laser scanning on the silicon steel metal particles or reducing the laser power executing the laser scanning, such that the silicon steel metal particles do not entirely melt and form an insulating layer. Execution of steps S1 and S2 is alternated until a laminated iron core having a (Continued)

plurality of alternating silicon steel metal layers and insulating layers is formed.

20 Claims, 6 Drawing Sheets

(51) Int. Cl.
*B23K 26/34* (2014.01)
*B22F 10/28* (2021.01)
*H02K 15/02* (2006.01)
*B22F 10/366* (2021.01)
*B22F 10/50* (2021.01)
*B23K 26/342* (2014.01)
*B33Y 40/00* (2020.01)
*B33Y 80/00* (2015.01)

(52) U.S. Cl.
CPC ............... *B33Y 10/00* (2014.12); *B33Y 40/00* (2014.12); *H02K 15/02* (2013.01); *B22F 2201/10* (2013.01); *B22F 2301/35* (2013.01); *B33Y 80/00* (2014.12)

ELECTRIC MOTOR, LAMINATED IRON CORE AND MANUFACTURING METHOD THEREFOR

PRIORITY STATEMENT

This application is the national phase under 35 U.S.C. § 371 of PCT International Application No. PCT/CN2019/088381 which has an International filing date of May 24, 2019, which designated the United States of America 2020, the entire contents of each of which are hereby incorporated herein by reference.

FIELD

The present application generally relates to the field of electric motors, in particular to an electric motor, a laminated iron core, and a manufacturing method therefor.

BACKGROUND

For electronic products such as electric motors and power transformers, copper wires are usually wound on a soft ferromagnetic component, which has a high magnetic permeability relative to air to increase magnetic flux, thereby achieving a high energy density (high strength) and efficiency.

As shown in FIG. 1, in order to reduce eddy current losses caused by the fluctuating magnetic field, a laminated iron core 10 is made by laminating silicon steel sheets covered with an insulation film, and laminated cores are usually used for power transformers and electric motors. Among them, the insulation film functions as a protective screen against eddy currents, so that eddy currents flow only in a finite closed loop, that is, in the thickness direction of each lamination shown in FIG. 1, wherein the arrow in FIG. 1 indicates the eddy current flow direction C1, and the arrow S1 perpendicular to the eddy current direction C1 indicates the direction of the magnetic field. FIG. 1 also shows a block iron core 20, which does not have the sheet lamination structure of a laminated iron core and in which eddy currents are also confined to a closed loop. The eddy current direction is indicated by the direction C2, and the arrow S2 perpendicular to the eddy current direction C2 indicates the direction of the magnetic field. Specifically, each lamination of the laminated iron core 10 has a thickness of around 0.3 mm. Since the current of an eddy current closed loop is proportional to the cross-sectional area of the sheet (and its resistance is inversely proportional to the cross-sectional area), this can reduce eddy currents to a very low level. Generally, the higher the operating frequency, the smaller the single-layer thickness of the laminated iron core 10 is.

In order to manufacture the laminated structure of the laminated iron core 10 as shown in FIG. 1, a cold-rolled silicon steel sheet is punched and assembled according to a laminated structure, which not only imposes stricter requirements for the manufacture of a silicon steel sheet structure, but also makes the assembly of the laminated structure of the entire laminated iron core 10 very complicated. In order to achieve optimal performance and miniaturization of components, the manufacture of laminated iron cores has become increasingly complicated, which poses the biggest problem and limitation to be addressed in the manufacture of laminated iron cores.

An iron core may also be made of epoxy resin in which soft magnetic particles are added, wherein the epoxy resin functions as an electrical isolation layer, making it possible to provide a magnetic core with high resistance and therefore reduced eddy current losses. However, the main shortcomings of the above-described soft magnetic composite iron core are its relatively low magnetic permeability (only 10% to 20% of that of a silicon steel material) and its low magnetic flux density.

SUMMARY

Additive manufacturing technology is also used to manufacture custom iron cores and iron cores having complex shapes to optimize magnetic properties and achieve miniaturization of original parts. However, the inventors have discovered that the existing additive manufacturing technology is only applicable to the manufacture of block magnetic cores, and is subject to considerable eddy current losses. The inventors have discovered that such eddy current losses will not only reduce the component efficiency, and heat generated by eddy currents can significantly impair the component performance, which will also hinder system miniaturization.

A first embodiment of the present invention provides a method for manufacturing a laminated iron core, wherein the manufacturing method is executed in an additive manufacturing printing apparatus and comprises the following steps: S1: injecting an inert gas into the additive manufacturing printing apparatus, spreading a silicon steel metal particle in a molding cylinder in the additive manufacturing printing apparatus, and performing laser scanning on the silicon steel metal particle, so that the silicon steel metal particle is melted layer by layer into at least one silicon steel metal layer; and S2: continuously spreading the silicon steel metal particle in the molding cylinder in the additive manufacturing printing apparatus, and stopping performing the laser scanning on the silicon steel metal particle or reducing a laser power for performing the laser scanning, so that an insulation layer in which the silicon steel metal particle is not fully melted is formed, step S1 and step S2 being alternately performed until a laminated iron core comprising a plurality of alternating silicon steel metal layers and the insulation layer is formed.

A second embodiment of the present invention provides a laminated iron core, wherein the laminated iron core is manufactured using the method for manufacturing a laminated iron core according to the first embodiment of the present invention.

A third embodiment of the present invention provides an electric motor comprising the laminated iron core manufactured using the method for manufacturing a laminated iron core according to the first embodiment of the present invention.

DETAILED DESCRIPTION OF EXAMPLE EMBODIMENTS

Figure 1:
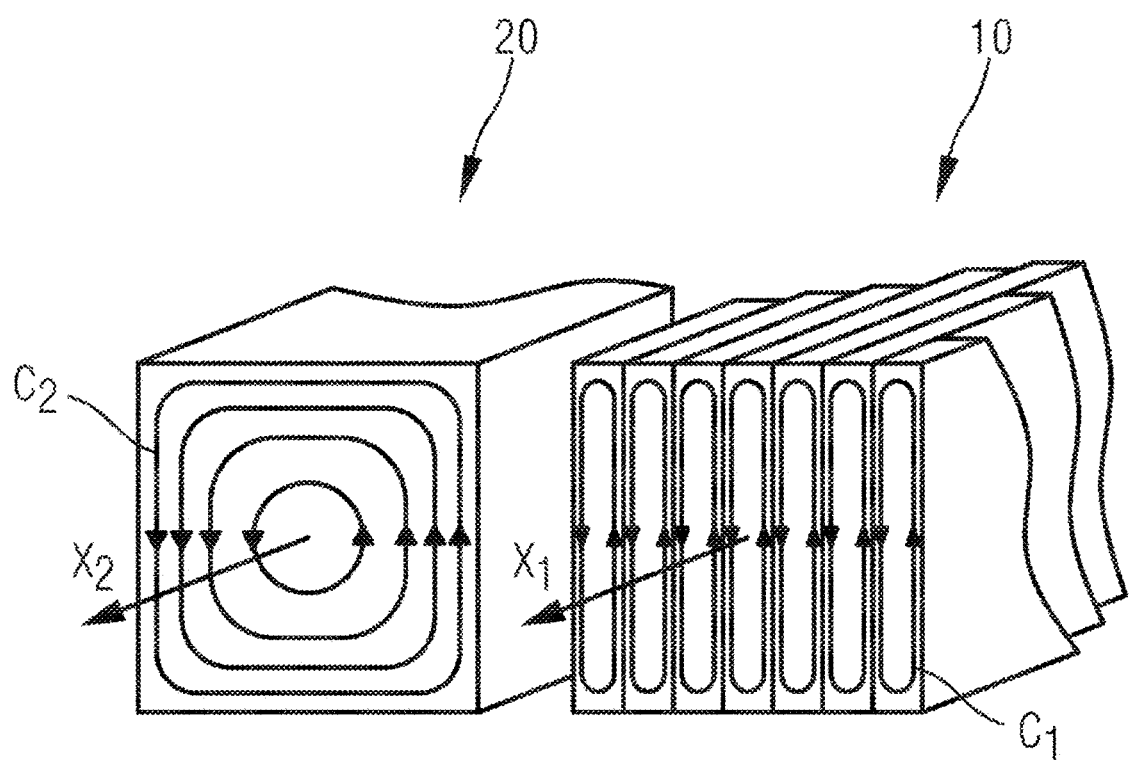
FIG. 1 is a schematic diagram comparing a laminated iron core and a block iron core in terms of structure and eddy current.

A first embodiment of the present invention provides a method for manufacturing a laminated iron core, wherein the manufacturing method is executed in an additive manufacturing printing apparatus and comprises the following steps: S1: injecting an inert gas into the additive manufacturing printing apparatus, spreading a silicon steel metal particle in a molding cylinder in the additive manufacturing printing apparatus, and performing laser scanning on the silicon steel metal particle, so that the silicon steel metal particle is melted layer by layer into at least one silicon steel metal layer; and S2: continuously spreading the silicon steel metal particle in the molding cylinder in the additive manufacturing printing apparatus, and stopping performing the laser scanning on the silicon steel metal particle or reducing a laser power for performing the laser scanning, so that an insulation layer in which the silicon steel metal particle is not fully melted is formed, step S1 and step S2 being alternately performed until a laminated iron core comprising a plurality of alternating silicon steel metal layers and the insulation layer is formed.

Further, in at least one embodiment, the silicon steel metal layer and the insulation layer are formed in a bottom-top direction.

Further, in at least one embodiment, the silicon steel metal layer and the insulation layer are formed in a horizontal direction.

Further, in at least one embodiment, step 2 further comprises the following step: continuously spreading the silicon steel metal particle in the molding cylinder in the additive manufacturing printing apparatus, and setting a spacing between adjacent laser scanning paths to be greater than 100 um when the laser power for performing the laser scanning on the silicon steel metal particle is reduced, so that the insulation layer in which the silicon steel metal particle is not fully melted is formed between adjacent laser scanning regions.

Further, in at least one embodiment, in a scanning path for performing the laser scanning on the silicon steel metal particle, a value range of a distance between two adjacent laser scanning positions is greater than 100 um, so that the insulation layer in which the metal particle is not fully melted is further formed between the two laser scanning positions.

Further, in at least one embodiment, the silicon steel metal layer is formed in a bottom-top direction and the insulation layer is formed in a horizontal direction.

Further, in at least one embodiment, step S1 further comprises the following step: performing laser scanning through parallel printing, wherein parallel printing laser scanning is performed along an X direction to obtain a grain direction in a Y direction, or parallel printing laser scanning is performed along a Y direction to obtain a grain direction in an X direction, the grain direction being an easy magnetization direction.

Further, in at least one embodiment, a value range of the laser power for performing the laser scanning in step S1 is 200 W to 1000 W, and a value range of a scanning speed of the laser scanning is 300 mm/s to 2000 mm/s.

Further, in at least one embodiment, a value range of a reduced laser power for performing the laser scanning in step S2 is 50 W to 500 W, and a value range of a scanning speed of the laser scanning is 500 mm/s to 2000 mm/s.

Further, in at least one embodiment, a value range of a thickness of the insulation layer is 20 um to 40 um.

Further, in at least one embodiment, a value range of a thickness of the silicon steel metal layer is 40 um to 400 um.

A second embodiment of the present invention provides a laminated iron core, wherein the laminated iron core is manufactured using the method for manufacturing a laminated iron core according to the first embodiment of the present invention.

A third embodiment of the present invention provides an electric motor comprising the laminated iron core manufactured using the method for manufacturing a laminated iron core according to the first embodiment of the present invention.

The mechanism for manufacturing a laminated iron core provided by at least one embodiment of the present invention utilizes additive manufacturing technology, and therefore requires no complicated component assembly steps. In the present invention, silicon steel metal particles not fully melted function as an insulation layer to avoid or reduce eddy current losses, and the distribution and formation directions of the silicon steel metal layer and of the insulation layer in the laminated iron core may be easily controlled by adjusting a scanning strategy, so that a structurally complex laminated iron core is formed. A laminated iron core manufactured according to the present invention has a more complex shape, optimized performance, and a smaller size. The present invention may even be used for fragile magnetic materials, such as high-silicon steel, with which it is more difficult to manufacture traditional laminated iron cores.

Specific embodiments of the present invention will be described below with reference to the drawings.

Additive manufacturing is one of the advanced manufacturing technologies rapidly developing in the world, and has shown prospects of wide application. The selected laser melting (SLM) process is an additive manufacturing technology, which allows quick manufacture of the same parts as a CAD model by means of selected laser melting. The selected laser melting process has been widely used. Different from traditional mechanisms for material removal, additive manufacturing is based on a completely contrary materials incremental manufacturing philosophy, wherein selected laser melting is performed to melt metal powder using a high-power laser, and parts/components are built layer by layer through 3D CAD input, so that components with complex internal channels may be successfully manufactured. Additive manufacturing technology can provide a unique potential for optionally manufacturing structurally complex components that usually are not easily manufacturable by traditional manufacturing processes.

Figure 2:
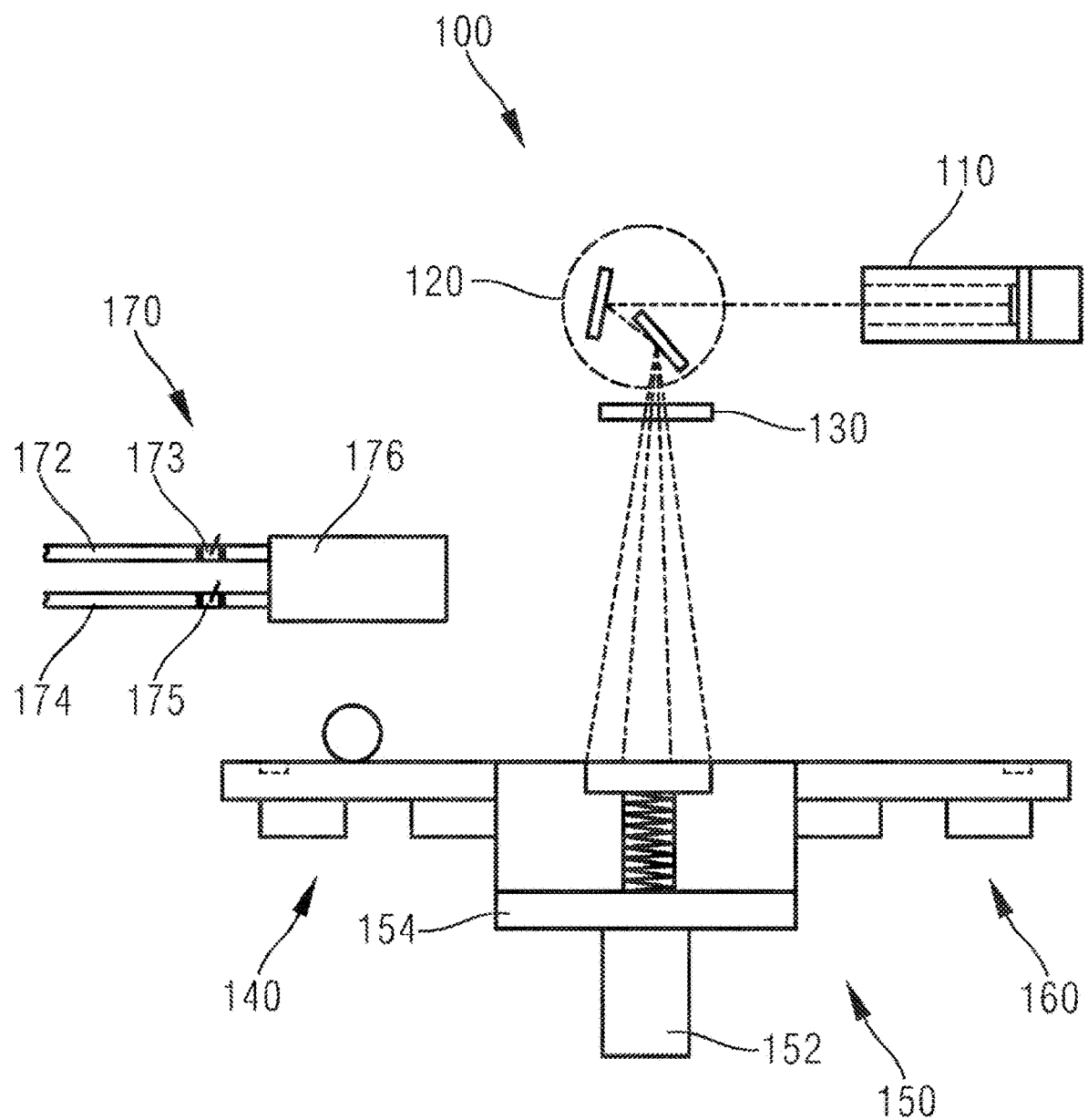
FIG. 2 is a schematic diagram of a selected laser melting device.

FIG. 2 is a schematic diagram of a selected laser melting device. As shown in FIG. 2, the selected laser melting device 100 comprises a laser source 110, a mirror scanner 120, a prism 130, a powder feeding cylinder 140, a molding cylinder 150, and a recovery cylinder 160. The laser source 110 is arranged above the selected laser melting device 100 and functions as a source for heating a metal powder, that is, melting the metal powder for 3D printing.

A first piston (not shown) movable up and down is provided in a lower part of the powder feeding cylinder 140, a spare metal powder is placed in a cavity space on the first piston of the powder feeding cylinder 140, and, as the first piston moves up and down, the metal powder is fed from the powder feeding cylinder 140 to the molding cylinder 150. A 3D print placement table 154 is provided in the molding cylinder 150, a 3D print is clamped above the placement table 154, and a second piston 152 is fixed below the placement table 154, wherein the second piston 152 is arranged perpendicular to the placement table 154. During 3D printing, the second piston 152 moves from top to bottom to form a printing space in the molding cylinder 220. The laser source 110 for laser scanning should be arranged above the molding cylinder 150 of the selected laser melting device, the mirror scanner 120 adjusts a position of the laser by adjusting an angle of a prism 130, and the prism 130 is adjusted to determine in which area the laser will melt metal powder. The powder feeding cylinder 140 further comprises a roller (not shown), the metal powder P is stacked on the upper surface of the first piston, and the first piston vertically moves from bottom to top to transfer the metal powder to the upper part of the powder feeding cylinder 140. The roller is rollable on the metal powder to send the metal powder P to the molding cylinder 150. Thus, laser scanning is continuously performed on the metal powder to decompose the metal powder into a powder matrix, and then laser scanning is continued on the powder matrix until the powder matrix is sintered from the bottom to the top into a print with a preset shape.

The selected laser melting device 100 further comprises a gas supply apparatus 170. The gas supply apparatus 170 comprises a first air inlet pipe 172 and a second air inlet pipe 174, as well as an outlet pipe 176. A first valve 173 is further provided on the first air inlet pipe 172, and a second valve 175 is provided on the second air inlet pipe 174. A control apparatus 171 is connected to the first valve 173 and the second valve 175, for controlling the opening and closing of the first air inlet pipe 172 and the second air inlet pipe 174.

A first embodiment of the present invention provides a method for manufacturing a laminated iron core, wherein the manufacturing method is executed in an additive manufacturing printing apparatus. The additive manufacturing printing apparatus is particularly the selected laser melting device 100.

Figure 3:
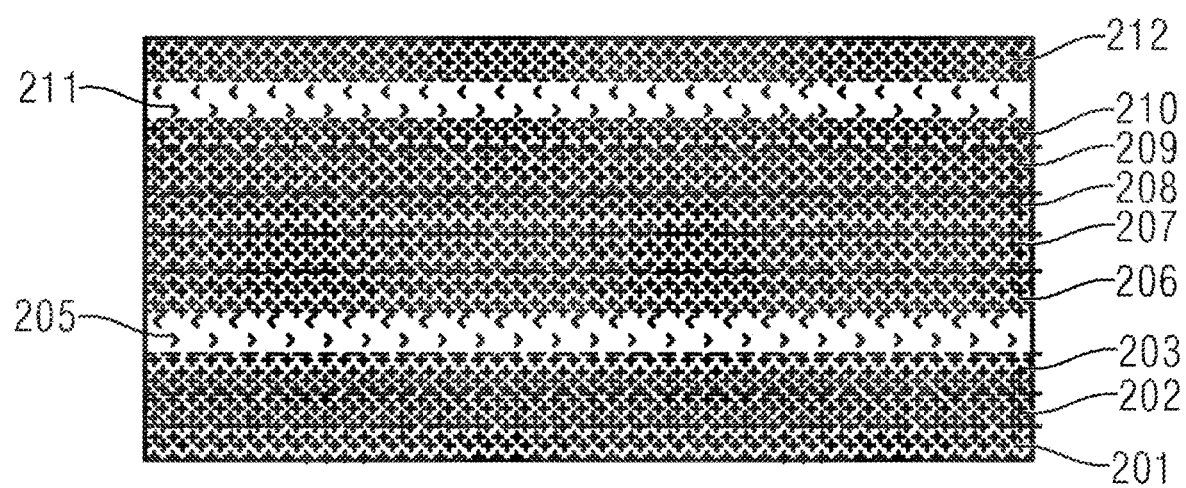
FIG. 3 is a schematic cross-sectional view of a process of a laminated iron core according to a specific embodiment of the present invention.

Firstly, step S1 is performed by injecting an inert gas into the additive manufacturing printing apparatus 100 and spreading a silicon steel metal particle in the molding cylinder 150 in the additive manufacturing printing apparatus. Specifically, the silicon steel metal particle is stored in the powder feeding cylinder 140, a piston arranged below the cylinder sends the silicon steel metal particle out of the powder feeding cylinder 140 by moving from bottom to top, and the silicon steel metal particle is conveyed from the powder feeding cylinder 140 through a roller to the molding cylinder 150. Then, the laser source 110 performs laser scanning on the silicon steel metal particle spread in the molding cylinder 150, so that the silicon steel metal particle is melted layer by layer into at least one silicon steel metal layer. For example, as shown in FIG. 3, a first silicon steel metal layer 201, a second silicon steel metal layer 202, and a third silicon steel metal layer 203 are formed.

The overall thickness of the silicon steel metal layer is determinable by the number of continuously formed silicon steel metal layers. For example, a 0.15 mm-thick silicon steel metal layer may be formed by 5 silicon steel metal layers each having a thickness of 30 um.

Then, step S2 is performed to continuously spread the silicon steel metal particle in the molding cylinder 50 in the additive manufacturing printing apparatus 100. Specifically, the silicon steel metal particle is stored in the powder feeding cylinder 140, a piston arranged below the cylinder sends the silicon steel metal particle out of the powder feeding cylinder 140 by moving from bottom to top, and the silicon steel metal particle is conveyed from the powder feeding cylinder 140 through a roller to the molding cylinder 150. At the same time, the laser source 110 is stopped from performing the laser scanning on the silicon steel metal particle or a laser power of the laser source 110 is reduced, so that a first insulation layer 205 in which the silicon steel metal particle is not fully melted is formed.

If fully melted after being subjected to the laser scanning, the silicon steel metal particle becomes a silicon steel metal layer of a silicon steel alloy, which is conductive. When an insulation layer 230 in which the silicon steel particle is not fully melted is formed, its partially melted part is not conductive and its fully melted part functions as an adhesive.

Step S1 and step S2 are alternately performed until a laminated iron core as shown in FIG. 3 that comprises a plurality of alternating silicon steel metal layers and the insulation layer is formed. As shown in FIG. 3, step S1 is first performed to form three silicon steel metal layers: a first silicon steel metal layer 201, a second silicon steel metal layer 202, and a third silicon steel metal layer 203. Then, step S2 is performed to form a first insulation layer 205. Next, step S1 is performed to form five silicon steel metal layers: a fourth silicon steel metal layer 206, a fifth silicon steel metal layer 207, a sixth silicon steel metal layer 208, a seventh silicon steel metal layer 209, and an eighth silicon steel metal layer 210. Then, step S2 is performed to form a second insulation layer 211. Finally, step S1 is performed to form a ninth silicon steel metal layer 212.

Figure 4:
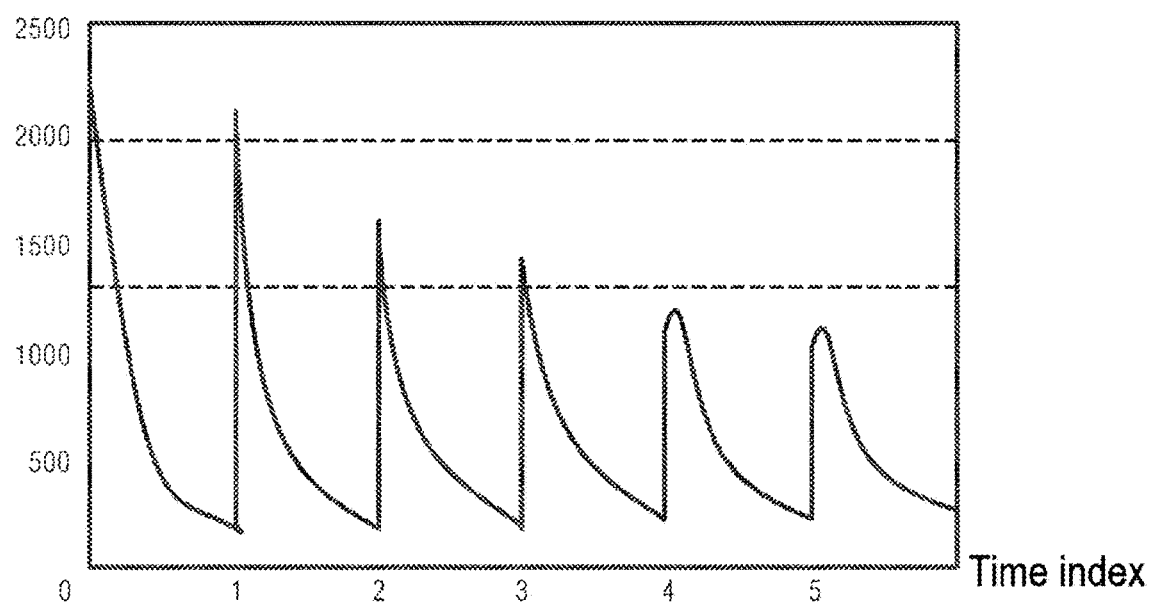
FIG. 4 is a graph of laser power penetrability according to a specific embodiment of the present invention.

FIG. 4 is a graph of laser power penetrability according to a specific embodiment of the present invention, where the abscissa indicates the time index, and the ordinate indicates the temperature of the material layer. When the laser is turned off or diminished, the laser power or temperature will still penetrate two or three material layers. As shown in FIG. 4, the abscissa 1 indicates that when the ninth silicon steel metal layer 212 is sintered, the temperature of the ninth silicon steel metal layer 212 is around 2200 K. The abscissa 2 indicates that when the ninth silicon steel metal layer 212 is sintered, the temperature of the second insulation layer 211 is around 2000 K. The abscissa 3 indicates that when the ninth silicon steel metal layer 212 is sintered, the temperature of the eighth silicon steel metal layer 210 is around 1600 K. When the ninth silicon steel metal layer 212 is sintered, the temperature of the eighth silicon steel metal layer 210 decreases gradually. Therefore, the present invention fully utilizes the penetrability of the laser power within a range of two or three material layers when sintering the current material layer.

Since the laser is turned off or diminished, the insulation layer is not fully melted, and has sufficient porosity and constrained unmelted metal powder. The insulation layer has sufficient adhesion, and therefore can function as an adhesive for adjacent silicon steel metal layers. For example, the first insulation layer 205 can function as an adhesive between the third silicon steel metal layer 203 and the fourth silicon steel metal layer 206, and the second insulation layer 211 can function as an adhesive between the eighth silicon steel metal layer 210 and the second insulation layer 211. Compared with a fully melted silicon steel metal layer, a partially melted insulation layer can also increase the resistance of the laminated iron core and function as an insulation layer for continuous magnetic silicon steel metal layers to reduce eddy currents.

In this embodiment, the silicon steel metal layer and the insulation layer are formed in a bottom-top direction.

Further, in a scanning path for performing the laser scanning on the silicon steel metal particle, a value range of a distance between two adjacent laser scanning positions is greater than 100 um, so that the insulation layer in which the metal particle is not fully melted is further formed between the two laser scanning positions.

Figure 5:
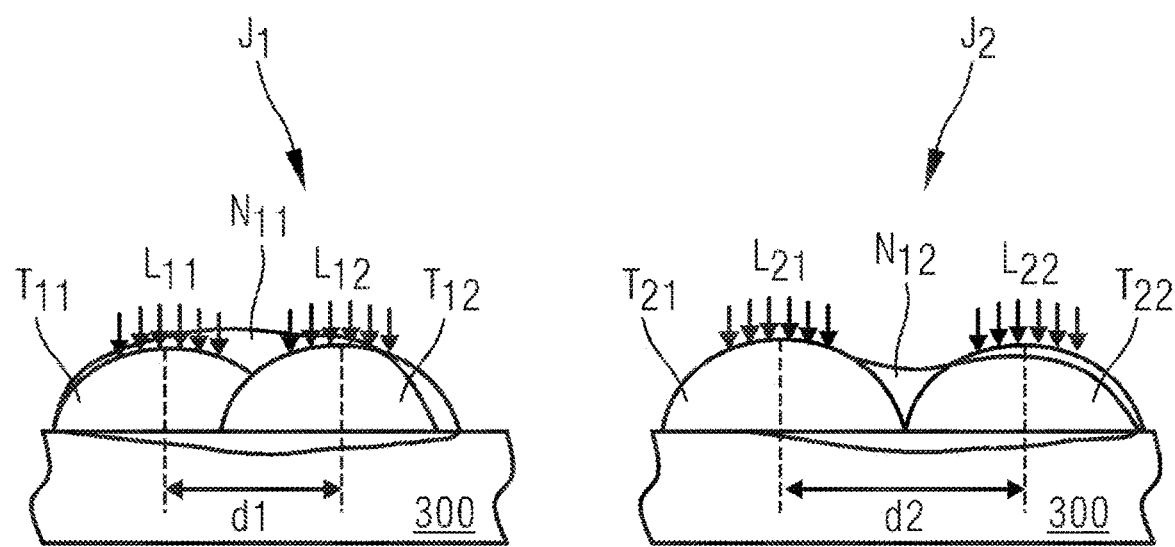
FIG. 5 is a laser scanning strategy diagram according to a specific embodiment of the present invention.

The silicon steel metal layer and the insulation layer may also be formed in a horizontal direction, and so the laser scanning strategy needs to be adjusted. As shown in FIG. 5, in this embodiment, parallel scanning is performed in an attempt to form a partially melted area on the plane. The laser scanning is performed vertically from top to bottom, and J1 indicates a normal scanning state, in which a spacing d1 between adjacent laser scanning paths is greater than 100 um, one scanning path and one adjacent path are generated at two adjacent laser positions L11 and L12, respectively, and an area N11 in which the metal powder is fully melted is generated between the laser scanning path and the adjacent scanning path, which means that a silicon steel metal layer may be formed in a horizontal direction.

J2 in FIG. 5 indicates a scanning strategy for forming an area in which metal power is not fully melted, in which a spacing d2 between adjacent laser scanning paths is greater than 100 um, one scanning path and one adjacent path are generated at two adjacent laser positions L21 and L22, respectively, and an area N12 in which the metal powder is fully melted is generated between the laser scanning path and the adjacent scanning path, which means that a silicon steel metal layer may be formed in a horizontal direction.

Figure 6:
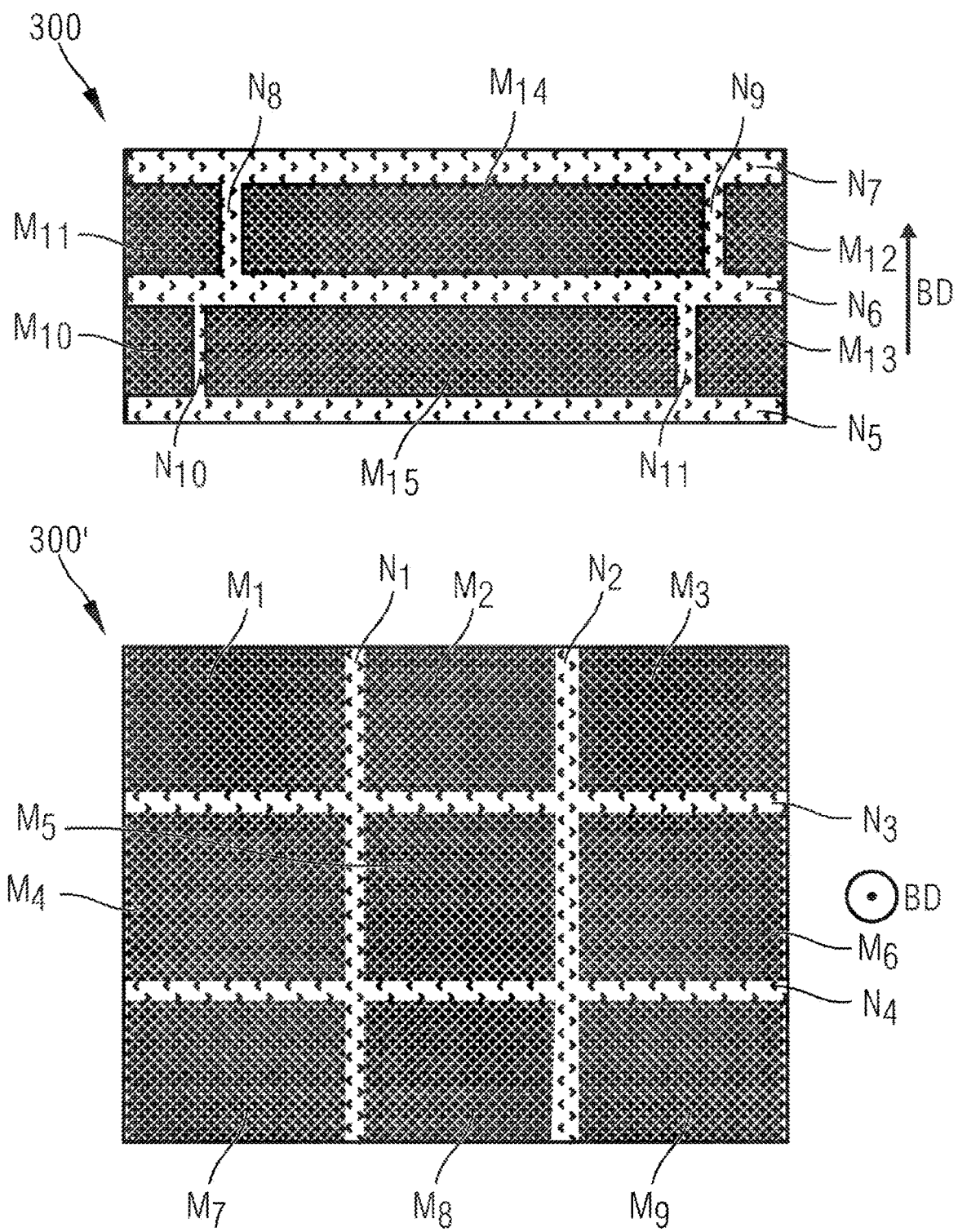
FIG. 6 is a schematic cross-sectional view of a process of a laminated iron core according to another embodiment of the present invention.

As shown in FIG. 6, the method for manufacturing the laminated iron core 300' adopts a planar scanning strategy, in which BD, the direction of formation of a material layer, is upwards perpendicular to the paper surface. Therefore, the spacing d1 between adjacent laser scanning paths is set to 100 um to form the metal material layer areas M1, M2, M3, M4, M5, M6, M7, M8, and M9 on the horizontal plane. At the same time, the spacing d2 between adjacent laser scanning paths is set to be greater than 100 um to form insulation areas N1, N2, N3, and N4 on the horizontal plane.

Preferably, the silicon steel metal layer is formed in a bottom-top direction and the insulation layer is formed in a horizontal direction. As shown in FIG. 6, the laminated iron core 300 is formed adopting a strategy of formation in a bottom-top direction and a horizontal direction. First, the insulation layer N5, the silicon steel metal layer between the insulation layers N5 and N6, the insulation layer N6, the silicon steel metal layer between the insulation layers N6 and N7, and the insulation layer N7 are sequentially formed along BD, the direction of bottom-top formation. Then, in conjunction with a parallel scanning strategy, insulation layers N8, N9, N10, and N11 are formed in a horizontal direction to form a structurally complex laminated iron core 300.

Further, laser scanning is performed through parallel printing, wherein parallel printing laser scanning is performed along an X direction to obtain a grain direction in a Y direction, or parallel printing laser scanning is performed along a Y direction to obtain a grain direction in an X direction, the grain direction being an easy magnetization direction.

Further, a value range of the laser power for performing the laser scanning in step S1 is 200 W to 1000 W, and a value range of a scanning speed of the laser scanning is 300 mm/s to 2000 mm/s.

Further, it is characterized in that a value range of a reduced laser power for performing the laser scanning in step S2 is 50 W to 500 W, and a value range of a scanning speed of the laser scanning is 500 mm/s to 2000 mm/s.

Further, a value range of a thickness of a nitride layer of the insulation layer not fully melted is 20 um to 40 um.

Further, a value range of a thickness of the silicon steel metal layer is 420 um to 400 um.

The mechanism for manufacturing a laminated iron core provided by the present invention utilizes additive manufacturing technology, and therefore requires no complicated component assembly steps. In the present invention, silicon steel metal particles not fully melted function as an insulation layer to avoid or reduce eddy current losses, and the distribution and formation directions of the silicon steel metal layer and of the insulation layer in the laminated iron core may be easily controlled by adjusting a scanning strategy, so that a structurally complex laminated iron core is formed. A laminated iron core manufactured according to the present invention has a more complex shape, optimized performance, and a smaller size. The present invention may even be used for fragile magnetic materials, such as high-silicon steel, with which it is more difficult to manufacture traditional laminated iron cores.

While the present invention has been described in detail with the above-mentioned preferred embodiments, it should be understood that the above description should not be construed as limiting the present invention. Various modifications and substitutions to the present invention will be apparent after perusal of the above content by those of ordinary skill in the art. Thus, the scope of protection of the present invention should be defined by the attached claims. In addition, no reference numeral in the claims should be construed as limiting the claims involved; the term "comprising" does not exclude other means or steps that are not listed in the claims or description; terms such as "first" and "second" only indicate a name, instead of indicating any specific sequence.

What is claimed is:

1. A method for manufacturing a laminated iron core, the method being performable in an additive manufacturing printing apparatus, the method comprising:
    S1: injecting an inert gas into the additive manufacturing printing apparatus, spreading a silicon steel metal particle in a molding cylinder in the additive manufacturing printing apparatus, and performing laser scanning on the silicon steel metal particle to melt the silicon steel metal particle, layer by layer, into at least one silicon steel metal layer; and
    S2: continuously spreading the silicon steel metal particle in the molding cylinder in the additive manufacturing printing apparatus, and stopping performing the laser scanning on the silicon steel metal particle or reducing a laser power for performing the laser scanning, to form an insulation layer in which the silicon steel metal particle is not fully melted,
    S1 and S2 being alternately performed until a laminated iron core, including a plurality of alternating silicon steel metal layers and the insulation layer, is formed.

2. The manufacturing method of claim 1, wherein the silicon steel metal layer and the insulation layer are formed in a bottom-top direction.

3. The manufacturing method of claim 1, wherein the silicon steel metal layer and the insulation layer are formed in a horizontal direction.

4. The manufacturing method of claim 3, wherein S2 further comprises:
    continuously spreading the silicon steel metal particle in the molding cylinder in the additive manufacturing printing apparatus, and setting a spacing between adjacent laser scanning paths to be greater than 100 um when the laser power for performing the laser scanning on the silicon steel metal particle is reduced, so that the insulation layer in which the silicon steel metal particle is not fully melted is formed between adjacent laser scanning regions.

5. The manufacturing method of claim 4, wherein in a scanning path for performing the laser scanning on the silicon steel metal particle, a value range of a distance between two adjacent laser scanning positions is greater than 100 um, so that the insulation layer in which the metal particle is not fully melted is further formed between the two laser scanning positions.

6. The manufacturing method of claim 1, wherein the silicon steel metal layer is formed in a bottom-top direction and the insulation layer is formed in a horizontal direction.

7. The manufacturing method of claim 1, wherein S1 further comprises:
performing laser scanning through parallel printing, wherein parallel printing laser scanning is performed along an X direction to obtain a grain direction in a Y direction, or wherein parallel printing laser scanning is performed along a Y direction to obtain a grain direction in an X direction, the grain direction being an easy magnetization direction.

8. The manufacturing method of claim 1, wherein a value range of the laser power for performing the laser scanning in S1 is 200 W to 1000 W, and a value range of a scanning speed of the laser scanning is 300 mm/s to 2000 mm/s.

9. The manufacturing method of claim 1, wherein a value range of a reduced laser power for performing the laser scanning in S2 is 50 W to 500 W, and a value range of a scanning speed of the laser scanning is 500 mm/s to 2000 mm/s.

10. The method of claim 1, wherein a value range of a thickness of the insulation layer is 20 um to 40 um.

11. The method of claim 1, wherein a value range of a thickness of the silicon steel metal layer is 40 um to 400 um.

12. A laminated iron core, manufactured using a method for manufacturing a laminated iron core, the method being performable in an additive manufacturing printing apparatus, the method comprising:
S1: injecting an inert gas into the additive manufacturing printing apparatus, spreading a silicon steel metal particle in a molding cylinder in the additive manufacturing printing apparatus, and performing laser scanning on the silicon steel metal particle to melt the silicon steel metal particle, layer by layer, into at least one silicon steel metal layer; and
S2: continuously spreading the silicon steel metal particle in the molding cylinder in the additive manufacturing printing apparatus, and stopping performing the laser scanning on the silicon steel metal particle or reducing a laser power for performing the laser scanning, to form an insulation layer in which the silicon steel metal particle is not fully melted,
S1 and S2 being alternately performed until a laminated iron core, including a plurality of alternating silicon steel metal layers and the insulation layer, is formed.

13. An electric comprising:
the laminated iron core of claim 12.

14. The manufacturing method of claim 2, wherein the silicon steel metal layer and the insulation layer are formed in a horizontal direction.

15. The manufacturing method of claim 14, wherein S2 further comprises:
continuously spreading the silicon steel metal particle in the molding cylinder in the additive manufacturing printing apparatus, and setting a spacing between adjacent laser scanning paths to be greater than 100 um when the laser power for performing the laser scanning on the silicon steel metal particle is reduced, so that the insulation layer in which the silicon steel metal particle is not fully melted is formed between adjacent laser scanning regions.

16. The manufacturing method of claim 15, wherein in a scanning path for performing the laser scanning on the silicon steel metal particle, a value range of a distance between two adjacent laser scanning positions is greater than 100 um, so that the insulation layer in which the metal particle is not fully melted is further formed between the two laser scanning positions.

17. The manufacturing method of claim 2, wherein the silicon steel metal layer is formed in a bottom-top direction and the insulation layer is formed in a horizontal direction.

18. The manufacturing method of claim 2, wherein S1 further comprises:
performing laser scanning through parallel printing, wherein parallel printing laser scanning is performed along an X direction to obtain a grain direction in a Y direction, or wherein parallel printing laser scanning is performed along a Y direction to obtain a grain direction in an X direction, the grain direction being an easy magnetization direction.

19. The manufacturing method of claim 2, wherein a value range of the laser power for performing the laser scanning in S1 is 200 W to 1000 W, and a value range of a scanning speed of the laser scanning is 300 mm/s to 2000 mm/s.

20. The manufacturing method of claim 2, wherein a value range of a reduced laser power for performing the laser scanning in S2 is 50 W to 500 W, and a value range of a scanning speed of the laser scanning is 500 mm/s to 2000 mm/s.

* * * * *